Sept. 22, 1964 R. J. BELROSE 3,149,651
PACKAGE UNIT SAW
Filed May 10, 1962
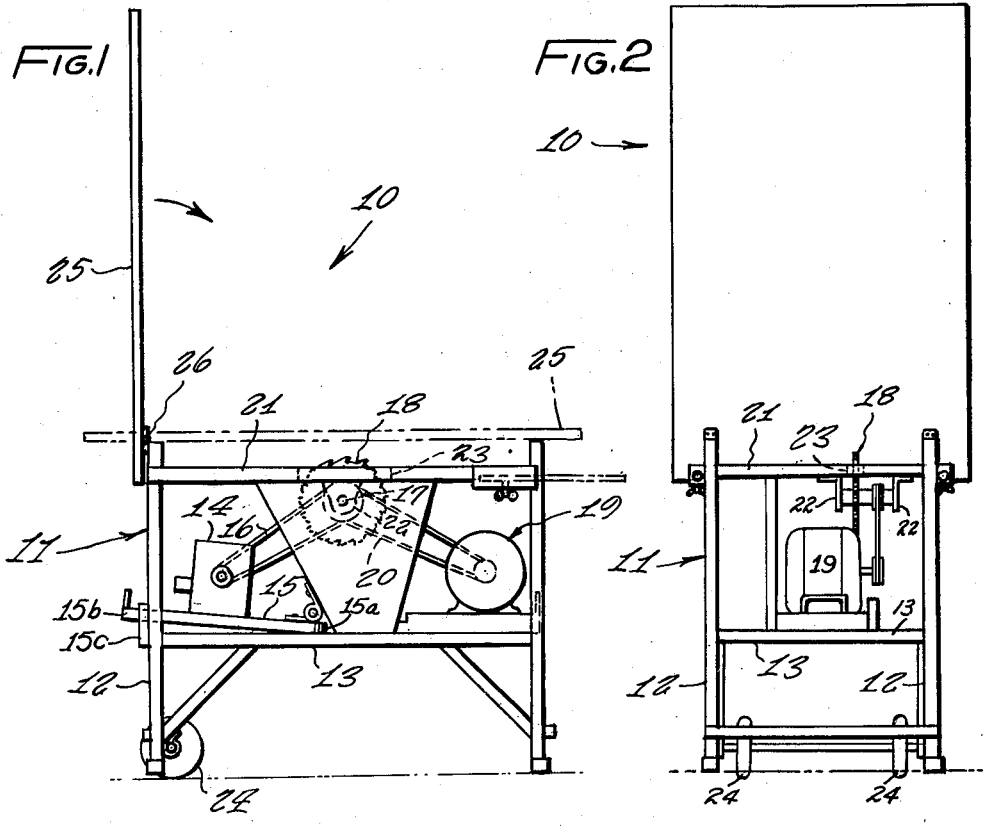
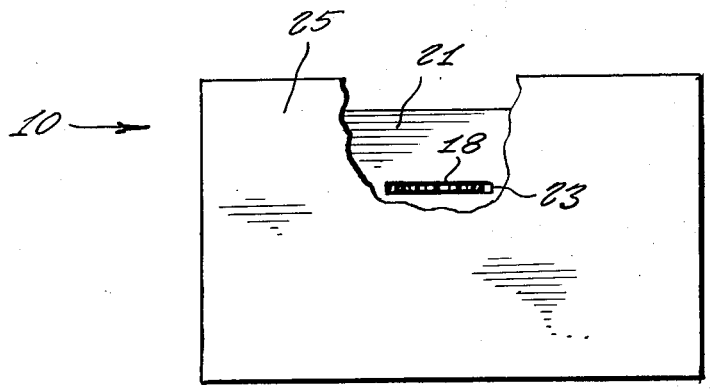
INVENTOR.
*Robert J. Belrose*

United States Patent Office 3,149,651
Patented Sept. 22, 1964

3,149,651
PACKAGE UNIT SAW
Robert J. Belrose, 368 Franklin St., Springfield 4, Mass.
Filed May 10, 1962, Ser. No. 193,756
3 Claims. (Cl. 143—33)

This invention relates generally to bench saw units and more specifically to a convertible bench saw unit.

One object of the present invention is to provide a package unit saw having means for use in ripping, buzzing, and cutoff operations.

Still another object of the present invention is to provide a package unit saw which can be used as a work bench and which is readily adaptable to be used as a picnic table.

Still another object of the present invention is to provide a package unit saw having means to be powered by either a gasoline motor or electrical motor.

Still another object of the present invention is to provide a package unit saw having a table top which is tiltable from a horizontal to a vertical position for conversion from a work bench or picnic table to a position for cutting off and similar operations.

Other objects of the invention are to provide a package unit saw bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a side elevation view of the present invention showing the device in one position and indicating by phantom lines an alternate position.

FIGURE 2 is an end elevation view thereof.

FIGURE 3 is a top plan view of the invention showing the table component thereof in a down position as indicated by phantom lines in FIGURE 1.

Referring now to the drawing in detail, the numeral 10 represents a package unit saw according to the present invention wherein there is a supporting frame 11 made preferably from steel stock which is welded or otherwise fastened together. The frame is comprised of a plurality of upstanding legs 12 which support a platform 13 therebetween upon which there are supported a pair of motors. A gasoline motor 14 is mounted upon a panel 15 which is supported freely pivotable about one edge 15a thereof upon the framework, the opposite edge 15b of the panel being pivotally movable about the first edge and guided in movement between guide elements 15c affixed to the framework. A belt 16 delivers power from the motor to a shaft 17 upon which a rotary saw 18 is mounted. Also supported on the platform 13, an electric motor 19 delivers power to the shaft 17 by means of a belt 20. A saw table top 21 is attached near the upper portions of the legs 12 and the shaft 17 is supported on the underside of the saw table top by means of brackets 22. An opening 23 is provided in the saw table top through which the upper portion of the rotary saw extends for purpose of performing sawing operations on the upperside of the table top. A pair of wheels 24 are attached to lower portion of the frame 11 for the purpose of providing ready movability of the device from one location to another as required. A picnic table or bench top 25 is attached by means of hinge 26 to the upper ends of two of the upstanding legs and the bench top is rotatable about the hinge from an upstanding vertical position as shown in FIGURE 1 to a horizontal position as indicated by phantom lines in FIGURE 1; thus the device may be selectively used as desired and the bench top may be pivoted upward or downward as required. In operative use when it is desired to use the package unit saw for cutoff work, the picnic table or bench top is pivoted upwardly to a vertical position, thus providing access to the rotary saw. The gasoline motor or the electric motor may then be set into operation whichever is preferred or adaptable to a particular situation. Work may then be performed in a conventional manner upon the saw table top 21. When it is desired to use the device as a work bench, the table top 25 is lowered into a horizontal position and work may be performed upon the upper surface thereof. When it is desired to use the device as a picnic table, the unit may be readily transported by moving the same on its wheels 24 to a desired location for the picnic. Thus there is provided a package unit saw which is adaptable for sawing work, for bench work, and for picnicking purposes. And the device may be readily used within the home or out of doors and it may be operated near a source of electrical power or independently away from other sources of power in which latter condition the device may be powered self-sufficiently by gasoline.

While various changes may be made in the detail construction, it shall be understood that such changes shall be within the spirit and scope of the present invention as defined by the appended claims.

What I claim as new and desire to protect by Letters Patent of the United States is:

1. In a saw unit, the combination of a supporting framework, means for supporting a pair of motors upon said framework, a saw table mounted upon said framework, a sawing mechanism including a saw shaft incorporated within said sawing table, drive means between said motors and said sawing mechanism, a work bench selectively usable upon said framework, a set of wheels for rollably transporting said saw unit from one location to another, said framework comprising a plurality of upstanding legs, a platform supported between said legs, said sawing table being located between said platform and the upper ends of said legs, said work bench being hingeably attached at the upper ends of two of said legs, said work bench being thereby pivotable between a vertical position and a horizontal position and in said horizontal position being disposed across the top of said legs, one of said motors being powered by gasoline and the other of said motors being powered by electricity, in said drive means each of said motors having a belt communicating with said shaft and a rotary saw affixed to said shaft, said motors being on opposite lateral sides of said shaft, said saw table having a pair of depending brackets on the underside thereof, said shaft extending between said brackets, said saw table having a vertically extending slot therethrough and said rotary saw extending upwardly through said slot for engagement with work on the upper side of said saw table.

2. In a saw unit, the combination as set forth in claim 1 wherein the said gasoline motor and said electrical motor may be selectively used to drive said shaft of said rotary saw.

3. In a saw unit, the combination as set forth in claim 1 wherein said gasoline powered motor is mounted on a base panel, said base panel being supported freely pivotable about one edge thereof upon said framework, the opposite edge of said panel being pivotably movable about said first edge, guide elements affixed to said framework adjacent each opposite side of said panel for confining laterally said base panel during pivotal movement, said base panel opposite edge being retained in suspended position by means of said belt communicating between said motor and said shaft.

References Cited in the file of this patent

UNITED STATES PATENTS

| | | |
|---|---|---|
| 1,450,906 | Anderson | Apr. 10, 1923 |
| 1,584,028 | Gottschalk | May 11, 1926 |
| 2,016,528 | Wilson | Oct. 8, 1935 |
| 2,523,680 | Christie | Sept. 26, 1950 |

FOREIGN PATENTS

| | | |
|---|---|---|
| 778,084 | France | Dec. 15, 1934 |
| 917,683 | France | Sept. 23, 1946 |
| 135,609 | Sweden | May 6, 1952 |